Patented Dec. 23, 1947

2,432,997

UNITED STATES PATENT OFFICE 2,432,997

PERFLUOROCYCLOHEXADIENE

Waldo B. Ligett, Detroit, Mich., and Earl T. McBee, La Fayette, and Vincent V. Lindgren, West Lafayette, Ind., assignors to Purdue Research Foundation, West Lafayette, Ind., a corporation of Indiana No Drawing. Application November 13, 1945, Serial No. 628,377

1 Claim. (Cl. 260—648)

This invention is concerned with a novel fluorocarbon, perfluorocyclohexadiene.

The compound is a non-flammable liquid, boiling at about 57 degrees centigrade at atmospheric pressure, having particular utility as an intermediate to be used in the preparation of compounds for the synthesis of fluorinated resins and additional utility as an intermediate in the preparation of hexafluorobenzene.

We have prepared the above named compound and have determined several of its physical constants whereby it may be identified. Its preparation may be accomplished in a number of ways, one of which involves the reaction of bromine trifluoride with an appropriate halogenated cyclic compound, e. g., hexachlorobenzene. Bromine trifluoride adds fluorine to any points of unsaturation and replaces, with fluorine, hydrogen and part of the chlorine in the molecule. Any bromine introduced is replaced by means of antimony pentafluoride. The product resulting from the reaction with antimony pentafluoride is subsequently dehalogenated with zinc dust, resulting in the formation of perfluorocyclohexadiene.

The following example illustrates one method for the preparation of this new compound and is in no way to be construed as limiting the invention thereto.

Five hundred and fifty-eight grams of bromine trifluoride was placed in a nickel tube 5.2 centimeters in diameter and 50 centimeters in length, closed at one end and cooled to zero degrees centigrade. Hexachlorobenzene was added thereto at a rate of about 100 grams per hour with continuous stirring by means of a motor driven nickel rod, inserted through the top of the tube and fitted with four blades, two inches apart on the rod. After each 100 gram quantity of hexachlorobenzene had been added, the tube was heated to 85 degrees centigrade, maintained at this temperature for at least fifteen minutes and then cooled to zero degrees centigrade. This prevented the accumulation and possible subsequent explosion or pyrolysis of unreacted starting materials. A total of 400 grams of hexachlorobenzene was charged to the reactor; the final ratio being approximately three moles of bromine trifluoride to one mole of hexachlorobenzene. The entire reaction mixture was heated at 100 degrees centigrade for four hours, after which excess bromine trifluoride was destroyed by the addition of cracked ice.

A liquid fluorochloro compound was used to dissolve the solid product which resulted and the resulting solution was heated in a Pyrex flask to 60 degrees centigrade with stirring. During three hours, 500 grams (2.3 moles) of antimony pentafluoride was added drop-wise thereto. The reaction mixture was heated to 120 degrees centigrade and maintained at this temperature for a period of about eight hours, during which time bromine and part of the solvent were evolved from the reaction mixture. The products of the reaction were then washed with hot concentrated hydrochloric acid to remove antimony salts.

After removal of the solvent, the solid product was dissolved in 500 milliliters of absolute ethanol. This solution was added over a six hour period to a refluxing suspension of 500 grams of zinc dust in ethanol. By elevation of the temperature, the more volatile products were distilled from the mixture with some alcohol. The higher boiling constituents were removed by steam distillation. The products were collected and alcohol was extracted therefrom by washing with water. The organic product was rectified in a 100-plate Podbielniak column and yielded perfluorocyclohexadiene, having the following structural formula:

Perfluorocyclohexadiene boils at 56.0–57.0 degrees centigrade at 743 millimeters of mercury pressure absolute and has a refractive index of 1.3149 at 20 degrees centigrade, a density of 1.601 grams per milliliter at 25 degrees centigrade, and a freezing point of approximately 6 degrees centigrade. The experimentally determined molecular weight was 223.0 compared with the theoretical molecular weight of 224.0.

We claim:

A perfluorocyclohexadiene having the following structural formula:

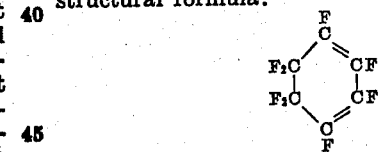

WALDO B. LIGETT.
EARL T. McBEE.
VINCENT V. LINDGREN.

REFERENCES CITED

The following references are of record in the file of this patent:

Barral, "Bull. Soc. Chim. de France," third series, vol. 13, pp. 418–423 (1895).

Van der Linden, "Recueil des Trav. Chim. des Pays-Bas," vol. 55, pp. 421–430 (1936).